May 17, 1932.  V. G. APPLE  1,858,870
DYNAMO ELECTRIC MACHINE FIELD ELEMENT
Filed April 5, 1928   2 Sheets-Sheet 1

INVENTOR
Vincent G. Apple

May 17, 1932.  V. G. APPLE  1,858,870

DYNAMO ELECTRIC MACHINE FIELD ELEMENT

Filed April 5, 1928   2 Sheets-Sheet 2

INVENTOR
Vincent G. Apple

Patented May 17, 1932

1,858,870

UNITED STATES PATENT OFFICE

VINCENT G. APPLE, OF DAYTON, OHIO

DYNAMO ELECTRIC MACHINE FIELD ELEMENT

Application filed April 5, 1928. Serial No. 267,782.

My invention relates to dynamo electric machine field elements wherein a core of magnetic material carries the coils, and a mass of molded insulating material covers the coils and extends beyond them to form a housing, within which the rotating element may revolve and to which a bearing head for said rotating element may be secured.

An object of my invention is to so proportion the core and coils as to leave considerable space between adjacent poles, to the end that insulating material which is being molded about the coils at one end of the core may flow thru the spaces between poles to the opposite end of the core, thereby permitting the coil ends at both ends of the core to be covered in a single molding operation, the larger masses of insulation at the ends of the core being thus joined and held to the core by integral struts of the same material extending between the poles.

Another object is to so form the mass of molded insulating material which covers the coils and provides the housing that it will contain a series of axially extending passages thru which a cooling medium may be made to flow when the machine is in operation.

I attain these and other objects by the structure shown in the accompanying drawings wherein—

Similar numerals refer to similar parts thruout the several views.

Figure 1:
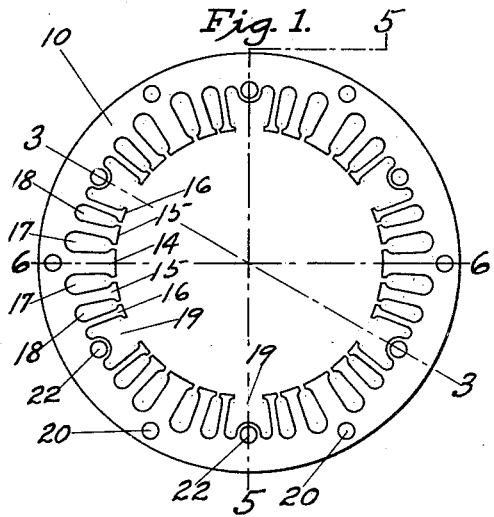
Fig. 1 is a plan of one of the core laminæ.
Figure 2:
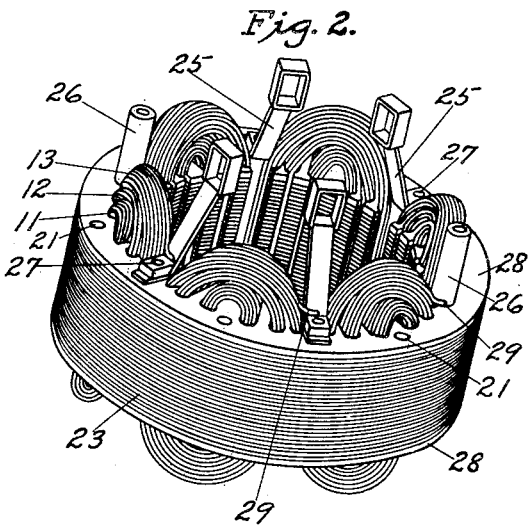
Fig. 2 shows the core, coils and terminals assembled.

To produce a field element which embodies my improvements I cut from suitable sheet magnetic material a plurality of laminæ 10, Fig. 1, slotted for a 6 pole winding having three coils 11, 12 and 13, Fig. 2 per pole. Each pole comprises five teeth 14, 15, 15, 16, 16, separated by winding slots 17, 17, 18, 18. The poles in turn are separated by the relatively wide spaces 19, 19 etc.

Figure 5:
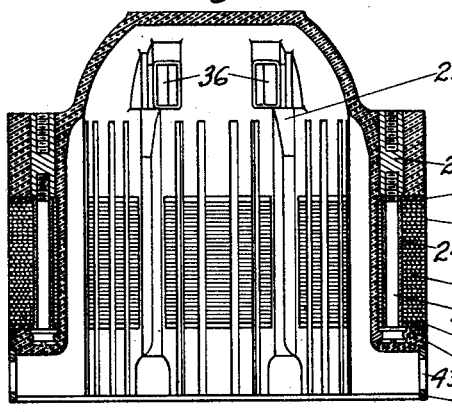
Fig. 5 is a cross section taken at 5—5 of Figs. 1 and 7.
Figure 6:
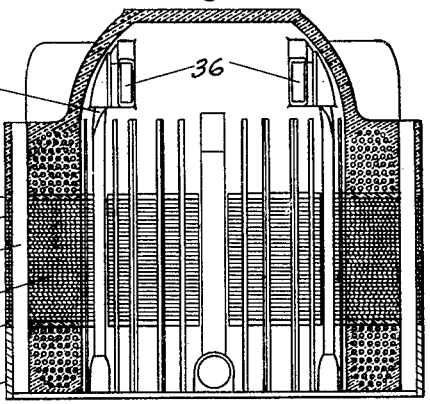
Fig. 6 is a cross section taken at 6—6 of Figs. 1 and 7.

Openings 20 which are adapted to later provide attaching bolt holes 21 Fig. 6 are placed at the center of each pole where the magnetic flux divides, so that they remove the least needed portion of the yoke material. Other openings 22 are placed midway between poles, and after a sufficient number of laminæ are assembled to compose a core 23 Fig. 2, openings 22 are lined with tubular insulators 24 (see Fig. 3) so that brush terminal stampings 25 and line terminal posts 26 may be attached to the core by screws 27, or other suitable fastening means, and yet be electrically insulated therefrom, the two outside laminæ 28 being also of insulating material. (See also Fig. 5).

Fig. 2 shows the core after the coils are placed and the line and brush terminals attached. The ends of the coils are joined to the terminals near their point of support on the core, as at 29, 29 etc., so that slight deflection of the terminals during the subsequent molding operation will not impair the joints between the wires and the terminals.

Whether the coils Fig. 2 should be impregnated with insulating varnish or the like before the structure is placed in the mold wherein the housing is formed depends somewhat on the fineness of the wire in the coils, the covering on the wire, the degree of fluidity to which the insulation from which the housing is to be molded may be brought, etc. When, as in the instant case, no impregnation is required the structure Fig. 2 is ready to have the housing molded thereto and is accordingly placed and supported in a mold as shown in Fig. 3, which is a cross section so taken thru the mold as to cut the field element at 3—3 of Figs. 1 and 7.

Figure 3:
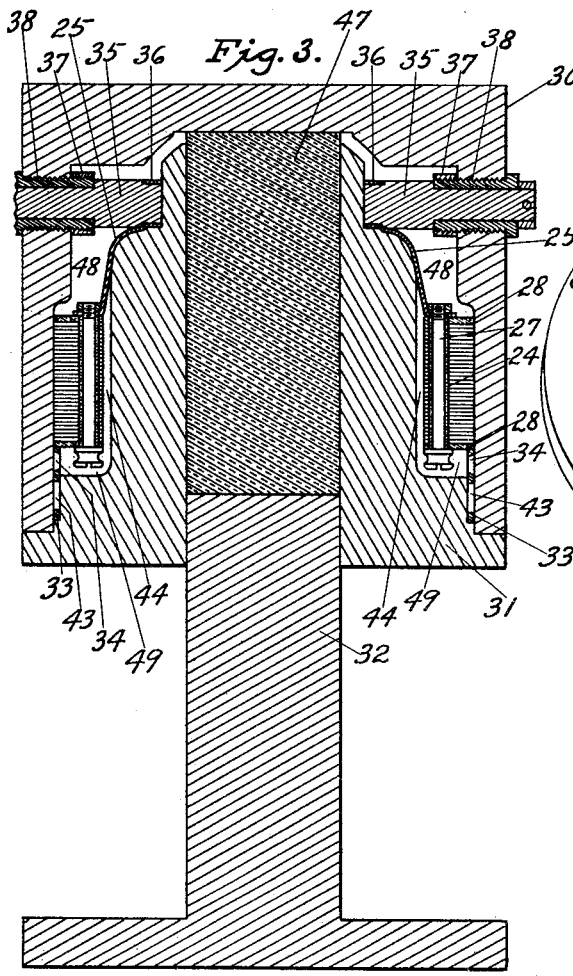
Fig. 3 is a cross section thru the mold taken to cut the field element therein at 3—3 of Figs. 1 and 7.
Figure 4:
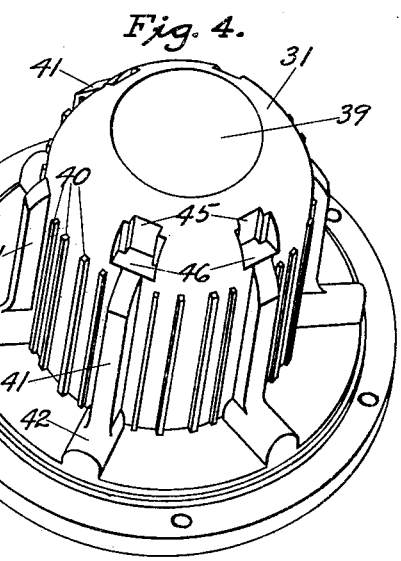
Fig. 4 shows the center plug of the mold in perspective.

The mold Fig. 3 comprises three main parts, the body 30, the plug 31, shown also in perspective in Fig. 4, and the plunger 32. A tubular member 33 (see also Fig. 9) keeps core 23 raised, before the insulation is placed, so that ends of the coils do not rest on the bottom of the mold. Member 33 has outwardly diverging holes 34 thru which the mass of molded insulation in the finished housing may extend to bind it to, and make it a part of the structure, and, if desired, member 33 may be further secured to the core by welding, or by bolts, screws, rivets, or other fastening means. Lateral pull bars 35 extend inwardly thru the wall of body 30 thru the brush pockets 36 of brush terminal stampings 25 to hold them correctly located and to exclude molded insulation therefrom, and also to keep the core from rising in the mold, the threaded sleeve 37, into which brush spring caps may later be screwed, being supported on threaded tubes 38 which enter thru correspondingly threaded holes in the mold body 30 and surround bars 35.

By reference to Fig. 4 it will be seen that plug 31 is a cylinder having an opening 39 adapted to receive plunger 32, the outside having a series of small axially extending keys 40 corresponding to, but slightly narrower than the inner ends of the winding slots in laminæ 10, and a lesser number of larger keys 41 corresponding to, but considerably smaller than the spaces 19 between coils of adjacent poles and extending axially therebetween to the lower end of the plug and there ending in lugs 42 which are adapted to form passages in the insulation extending radially outward and communicating with openings 43 in tubular member 33. (See Fig. 3.)

Keys 41, being slightly narrower and considerably less in height than spaces 19, leave apertures 44, Fig. 3 of considerable size between the surfaces of the keys and the wound structure, thru which the insulation may pass when the housing is being molded, from the larger mass at the upper end of the core to supply the lesser mass at the lower end, the insulation remaining in these apertures after molding is effected being hardened along with the larger masses at opposite ends of the core to assist in tying them one mass to the other and consequently to the core. Recesses 45 admit the ends of pockets 36 and the wider portions 46 of the recesses permit insulation to surround a portion of each pocket.

When the structure Fig. 2 has been placed in the mold Fig. 3, and supported therein as indicated, plunger 32 is removed, the insulation 47 placed in opening 39, then the plunger returned. It is readily seen that when the plunger is forced upward the insulation will first fill the larger cavity 48 at the upper end of the mold and then flow thru the axially extending apertures 44 between keys 41 and spaces 19 to fill the cavity 49 at the lower end.

After the insulation 47 is forced from opening 39 into cavities 48 and 49 it is hardened by whatever process the nature of the insulation requires then removed from the mold.

Figure 7:
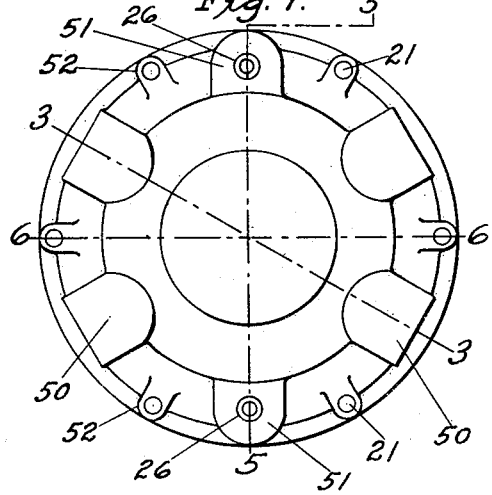
Fig. 7 is a top view of the finished field element.
Figure 8:
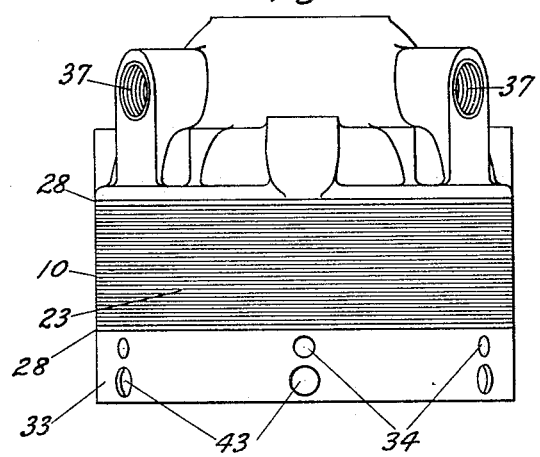
Fig. 8 is an elevation of the finished field element.
Figure 9:
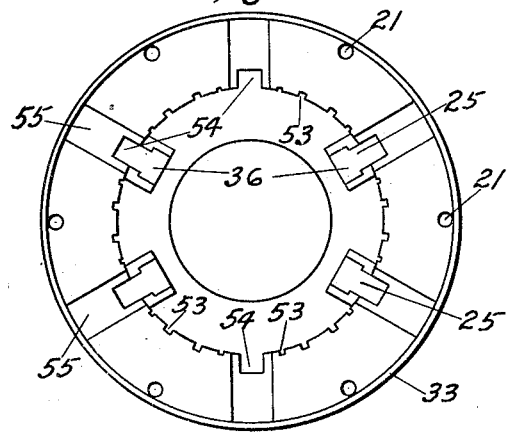
Fig. 9 is a bottom view of the finished field element.

When threaded tubes 38 and pull bars 35 have been laterally withdrawn and the mold body 30 has been removed and the plug 31 has been withdrawn, the structure appears as in Figs. 7, 8 and 9 wherein the closed end, Fig. 7, carries bosses 50, 50 etc., containing pockets for brushes and brush springs, bosses 51, 51 surrounding the line terminal posts, and bosses 52, 52 etc., thru which attaching bolts may pass. The bottom view Fig. 9 shows the keyways 53, 53 etc., left in the molding by the small keys 40 of the plug 31, and the larger keyways 54, 54 etc., left by the larger keys 41. In a completed dynamo electric machine these keyways serve as ducts thru which a cooling medium may move axially thru the field element, then radially thru the grooves 55, 55 etc., to the openings 43 in tubular member 33, and the material remaining in the axially extending passages 44 between the keys 41 and the spaces 19 form a series of channel shaped struts which resist axial tension brought to bear on the structure.

Tubular member 33 which served to locate core 23 in the mold now serves as a protective armor at the lower end of the core and provides the annular rib which is usually required to concentrically locate an end member carrying the armature shaft bearings.

The mold herein shown and described embodies a feature covered in my copending application Serial Number 262,460, filed March 17th, 1928, namely that of forcing the insulation against the bottom of the stock cavity to compel it to move laterally of the movement of the plunger, so that unfluxed material may not be pressed directly against the coils as in conventional molds, but it is apparent that the features sought to be covered by the present application may be embodied in a mold of the conventional type, or in a mold of a different type, and while in the foregoing I have shown and described a structure embodying my improvements, departures therefrom, such as altering the number of poles, using a solid instead of a laminar core, a concentrated instead of a distributed pole, and many others may obviously be brought within the scope of the invention, which to further define.

I claim—

1. A dynamo electric machine field element comprising, a slotted core, coils in said slots extending axially beyond said core and having axially extending spaces of considerable size between coils of adjacent poles, and a continuous mass of insulating material providing a covering for the coils at each end of the core joined by integral struts of the same material extending thru the said spaces.

2. A dynamo electric machine field element comprising, a core, coils extending axially beyond said core, said coils being of such width as to leave axially extending spaces between coils of adjacent poles, a continuous mass of insulation covering said coils at both ends of said core and extending thru said spaces, there being axially extending ventilating ducts in that part of the said insulating material which extends thru the said spaces.

3. A dynamo electric machine field element comprising, a slotted core, coils partly filling said slots and extending axially beyond said core at both ends, and a single mass of insulating material covering completely said coils, having axially extending ventilating ducts in the insulation extending thru those portions of the slots not occupied by said coils.

4. A dynamo electric machine field element comprising, a core, coils extending axially beyond said core, the coil sides being of such width as to leave axially extending spaces between coils of adjacent poles, and a continuous mass of insulation covering said coil ends and extending thru said spaces, in such a manner as to leave axially extending ventilating grooves in that part of the said insulating material which extends thru the said spaces and radially extending ventilating grooves between the said coils at the end of the core communicating with said axially extending grooves.

5. A dynamo electric machine field element comprising, a core, coils extending axially beyond said core, the coil sides being of such width as to leave axially extending spaces between coils of adjacent poles, a perforated metal ring at one end of the core surrounding said coils where they extend axially beyond the core, and a continuous mass of insulating material covering said coils, extending thru said spaces and into the perforations of said ring, said mass having axially extending ventilating grooves in that part of said insulating material which extends thru the said spaces and radially extending ventilating grooves between the said coils at the end of said core communicating with the said axially extending grooves, and said ring having radial openings registering with said radially extending grooves.

6. A dynamo electric machine element comprising, a core having winding slots, coils on said core, the coil ends extending axially beyond the ends of said core and the coil sides partly filling the said slots, and a single piece of insulation covering the coil ends and the coil sides in the slots, said mass having a central opening with a plurality of keyways extending lengthwise through said opening, said keyways being in that part of the said insulation lying within said slots and over the said coil sides.

In testimony whereof, I have hereunto set my name.

VINCENT G. APPLE.